United States Patent [19]
Eastmond et al.

[11] Patent Number: 5,923,454
[45] Date of Patent: Jul. 13, 1999

[54] MODEM METHOD AND DEVICE FOR INDICATING RECEIVED SIGNAL STRENGTH AND PRESENCE FOR INTENSITY MODULATED BINARY-CODED WIRELESS DATA PACKETS WITH REDUCED RECOVERY TIME

[75] Inventors: Bruce C. Eastmond, Downers Grove; Rachid M. Alameh, Schaumburg; S. David Silk, Palatine, all of Ill.

[73] Assignee: Motorola, Inc., Schaumburg, Ill.

[21] Appl. No.: 08/729,223

[22] Filed: Oct. 9, 1996

[51] Int. Cl.$^6$ ...................................................... H04B 7/00
[52] U.S. Cl. .......................... 359/189; 359/194; 359/195; 375/350; 455/226.2
[58] Field of Search .................................. 359/189, 195, 359/194; 375/316, 346, 350; 455/226.1, 226.2, 226.3, 150.1

[56] References Cited

U.S. PATENT DOCUMENTS

| | | | |
|---|---|---|---|
| 4,320,400 | 3/1982 | Chasek | 343/100 CL |
| 4,849,989 | 7/1989 | Kamerman | 375/13 |
| 4,887,265 | 12/1989 | Felix | 455/33 |
| 4,933,641 | 6/1990 | Hsiung et al. | 328/145 |
| 5,465,398 | 11/1995 | Flammer | 455/69 |
| 5,489,868 | 2/1996 | Gilbert | 327/351 |
| 5,627,857 | 5/1997 | Wilson | 375/219 |

OTHER PUBLICATIONS

"From Text To Speech—The MITalk System" by Jonathan Allen, M. Sharon Hunnicutt and Dennis Klatt; Cambridge University Press, pp. 108–122 and 181–201.

"Speech Communication—Human and Machine" by Douglas O'Shaughnessy, INRS–Telecommunications; Addison–Wesley Publishing Company, pp. 55–63.

*Primary Examiner*—Edward Lefkowitz
*Attorney, Agent, or Firm*—Darleen J. Stockley

[57] ABSTRACT

The present invention provides a modem (100), method (300) and device (103) for indicating received signal strength and presence for intensity modulated binary-coded data packets with reduced recovery time in a packet data receiving system. The device includes a receiver for binary coded wireless data packets having a first band-pass processing unit, for receiving modulated electromagnetic signals and converting the modulated electromagnetic signals to binary data signals and a second band-pass processing unit, coupled to the receiver, for providing a logarithmic received signal strength indicator signal, RSSI, using a low-frequency cutoff $f_{L2}$ greater than a low-frequency cutoff $f_{L1}$ of the first band-pass processing unit.

26 Claims, 3 Drawing Sheets

MODEM METHOD AND DEVICE FOR INDICATING RECEIVED SIGNAL STRENGTH AND PRESENCE FOR INTENSITY MODULATED BINARY-CODED WIRELESS DATA PACKETS WITH REDUCED RECOVERY TIME

FIELD OF THE INVENTION

The present invention relates to intensity modulated binary-coded data packets, and more particularly, to recovery time associated with intensity modulated binary-coded data packets.

BACKGROUND OF THE INVENTION

Many binary communication systems format data into packets, consisting of a plurality of symbols, in order to permit access to the available transmission medium bandwidth by multiple stations. Intensity modulation is easily generated and detected, and for this reason it is frequently employed to transmit binary data in optical fiber and wireless infrared (IR) communication systems,. Photoconductive-mode detection of optical signals by a photodiode may be modeled as a shot noise process, in which photons reach the photodiode at random intervals according to a Poisson distribution. Most of the photons generate photoelectron-hole pairs which produce a fluctuating current with a mean and variance proportional to the incident power and a substantially white spectral density.

The binary data signal may be encoded to eliminate the need for dc response in the system. Examples of appropriate encoding techniques that may be used for this purpose include pulse position modulation (PPM), of which the well-known Manchester code is a subset, Hedeman coding, delay modulation, and mBnB transformation.

An example of a high-performance receiver for binary-coded intensity modulated data is found in Eastmond, et al., "Receiver for Binary-Coded Wireless Optical Data", U.S. Pat. No. 5,355,242, Assignee: Motorola, Inc. In this receiver, the total gain is made sufficiently large so that a binary signal is produced at the receiver output by front-end noise even when a signal is not present. The presence of a continuous output from the receiver creates problems for some system protocols; for example, the CSMA/CD protocol of Ethernet cannot function if the channel appears to be continuously active. In this case, the receiver must include a squelch to mute the output when the signal is absent. Rapid squelch response is especially important in high-speed systems such as Ethernet, in which the duration of a bit is 100 microseconds and the duration of a packet may be substantially less than 1 millisecond.

In wireless optical systems, both the desired optical signal and ambient light sources, such as the sun and incandescent lighting, contribute to the photodiode current. Although the dc component of ambient light-induced photodiode current can be rejected from the receiver by a high-pass coupling network such as a transformer, the fluctuating component of this current at frequencies within the receiver passband may have sufficient amplitude to exceed the thermal noise floor. If the receiver noise floor increase is sufficient to exceed a predetermined squelch threshold, then a false indication of signal presence will be produced. Thus, a simple, fixed-threshold squelch is inadequate for a receiver which operates in the wireless environment.

Wireless receivers which include at least two receiving branches require that a figure of merit for each branch be developed, which will be used to maximize the received signal to noise ratio according to a predetermined strategy. An example of an appropriate strategy for a multiple-branch receiver in which the branches have non-overlapping fields of view is to mute the output from all branches except for the one producing the highest received signal strength indicator (RSSI) output.

Wireless optical systems are characterized by a propagation loss factor which varies as the inverse square of the distance separating the transmitter and receiver due to the spreading of energy in space. In order to accommodate the wide amplitude variations in both signal and noise encountered in the wireless environment, the RSSI should be proportional to the logarithm of the signal plus noise envelope.

A first example of prior art is the squelch used in optical fiber receivers. Since the fiber is a closed, guided-wave system, the photodiode produces no response to ambient light and the propagation loss is determined by fiber material, manufacturing, and installation imperfections. Consequently, it is common practice for an optical receiver squelch to employ an RSSI responding directly to the signal envelope, not to its logarithm, and to compare the received signal envelope to a predetermined threshold.

A second example of a high-speed data squelch known in the art is found in Alameh, et al., "Method and Apparatus for Detecting Binary Encoded Data", U.S. Pat. No. 5,490,175, Assignee: Motorola, Inc. Signal presence is determined by examining the zero crossing pattern of the receiver output, but the relative signal amplitude in two or more branches cannot be determined by this example of prior art as disclosed.

A third example of prior art is the logarithmic RSSI used in many cellular and land-mobile radio receiver IF amplifier/limiter ICs, such as the Motorola MC13158 described in *Analog/Interface ICs Device Data*, Vol. II, Series J, First Printing ©MOTOROLA, INC., 1995. A fundamental limitation to the use of such logarithmic processing in a high-speed data squelch is the extended recovery time following a data packet. This behavior, which is evident in published experimental results, e.g., Hughes, R. S., *Logarithmic Video Amplifiers*, Artech House, Inc., ©1971, FIG. 83, can be better understood by considering the post-packet transient response of a logarithmic RSSI, f(t), given by $$f(t) = \log_{10}\left\{A \cdot e^{-\left(\frac{t}{\tau}\right)}\right\}, t > 0,$$

where A is the packet signal amplitude, and $\tau$ is the recovery time constant. This may be re-written as $$f(t) = \log_{10}\{A\} - .43 \cdot \left(\frac{t}{\tau}\right)$$

Note that the logarithmic recovery transient is a linear, rather than an exponential function of time t.

If a voltage, $\log_{10}\{A_0\}$, defines the RSSI level at which the squelch threshold is set, then the RSSI response will assume this level at a time $t_0$, which represents the time delay between the cessation of a packet and muting of the receiver output. It can then be shown that $$t_0 = 2.3 \cdot \tau \cdot \log_{10}\left\{\frac{A}{A_0}\right\}, A_0 < A$$

or, $$t_0 = (.115) \cdot \tau \cdot \left.\frac{A}{A_0}\right|_{dB}.$$

Consider a wireless Ethernet receiver, consisting of a detector, baseband bandpass filter, and limiter/RSSI connected in tandem. The lower (high-pass) cutoff frequency of the baseband bandpass filter preceding the limiting amplifier, $f_{L1}$, is 500 kHz, and the corresponding recovery time constant is $$\tau = \frac{1}{2 \cdot \pi \cdot f_{LI}} = 320 \text{ ns}$$

or 3.2 bits. If the packet envelope peak amplitude is 60 dB above the squelch threshold, then $$t_0 = (0.115) \cdot (320 \cdot 10^{-9}) \cdot (60) = 2.2 \text{ } \mu s,$$

to or 22 bits, and a burst of noise having significant duration will follow the packet. The recovery time cannot be significantly reduced by increasing $f_{L1}$ without incurring an unacceptable increase in signal distortion at the limiter output.

Accordingly, in a receiver for intensity modulated binary coded data packets there is need for a method and device to provide an accurate indication of signal presence and magnitude over a wide dynamic range of signal and noise which exhibits reduced recovery time and also incorporates means for selecting the strongest signal among a plurality of receivers.

DETAILED DESCRIPTION OF A PREFERRED EMBODIMENT

Figure 1:
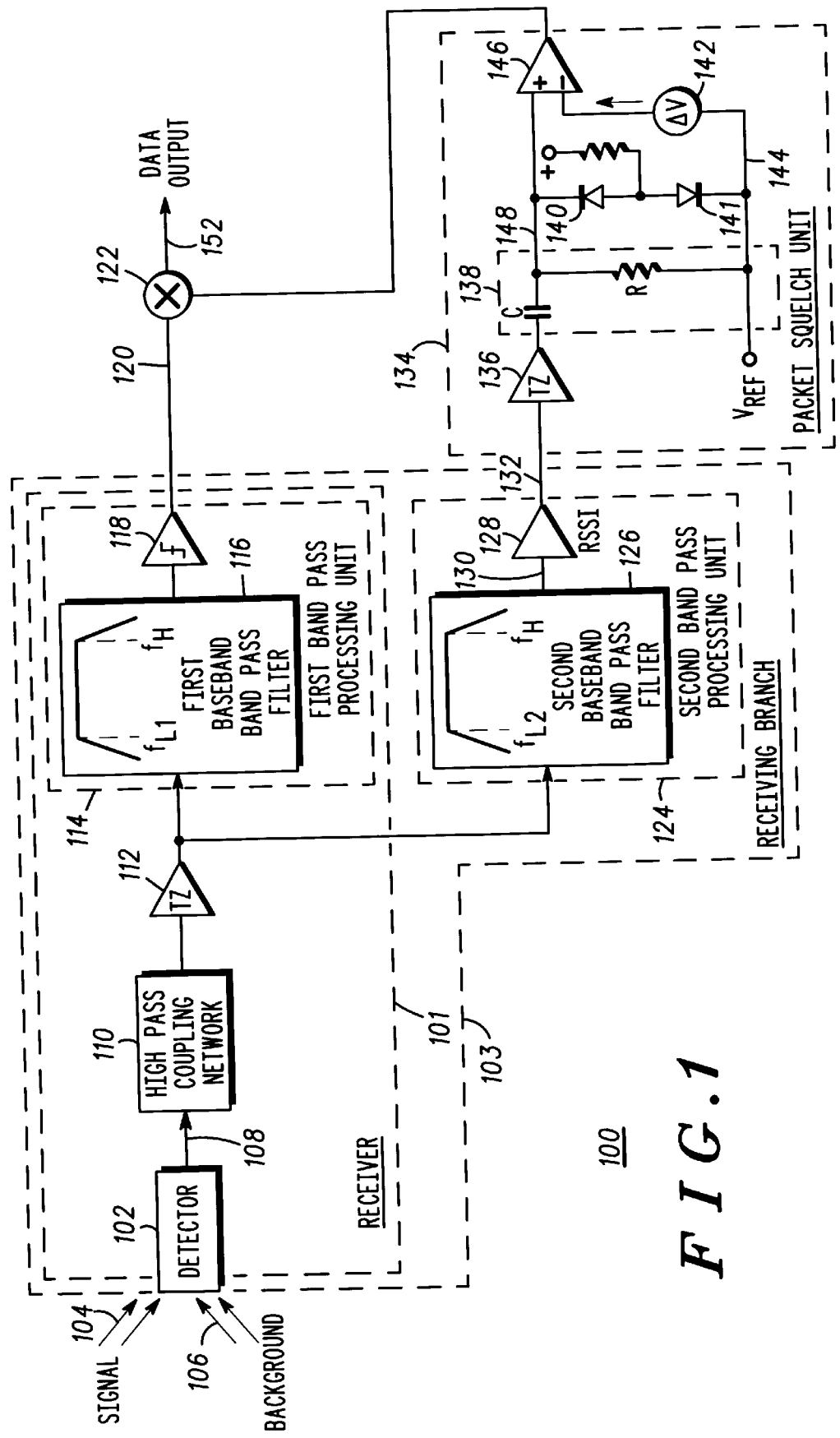
FIG. 1 shows a block diagram of a receiving system/modem for binary-coded wireless data packets in accordance with the present invention.

FIG. 1 is a block diagram of a receiving system/modem (100) that includes a receiver (101), a squelch switch (122), a second band-pass processing unit (124), and a packet squelch unit (134). A receiving branch (103) includes the receiver (101) and the second band-pass processing unit (124).

In the receiver (101), an electromagnetic signal (104), modulated according to binary-coded data packets, and background electromagnetic radiation (106) are converted to a current (108) in a detector (102). Low-frequency components of current (108) are removed by a high-pass coupling network (110) prior to current-to-voltage conversion in a first transimpedance amplifier (112).

In a first band-pass processing unit (114), the output of the first transimpedance amplifier (112) is coupled to a limiter (118) through a first baseband band-pass filter (116). The bandwidth of the first baseband band-pass filter (116), as defined by low-frequency cutoff $f_{L1}$ and high-frequency cutoff $f_H$, is chosen to remove noise generated in detector (102) by background electromagnetic radiation (106), and thermal noise generated in first transimpedance amplifier (112), without introducing appreciable distortion or intersymbol interference to the binary coded data signal. For binary-coded Ethernet signals, appropriate values for $f_{L1}$ and $f_H$ are 500 kHz and 15 MHz, respectively. The gain of limiter (118) is sufficiently large so that a binary signal (120) is produced by thermal noise generated in the first transimpedance amplifier (112), or noise generated in detector (102) when an electromagnetic signal (104) is not present. A squelch switch (122) blocks the binary signal (120) from data output (152) when binary-coded data signals are not present.

In the second band-pass processing unit (124), the output of the first transimpedance amplifier (112) is coupled to a received signal strength indicator, RSSI (128), through the second baseband band-pass filter (126). An example of a component suitable for use as RSSI (128) is the Motorola MC13158 wideband FM IF subsystem. Using such a component, the RSSI output (132) is substantially proportional to the logarithm of the second baseband band-pass filter output signal (130). The bandwidth of the second baseband band-pass filter (126) is defined by the low-frequency cutoff $f_{L2}$ and the high-frequency cutoff $f_H$. The low-frequency cutoff $f_{L2}$ of the second baseband band-pass filter (126) is made greater than the low-frequency cutoff $f_{L1}$ of the first baseband band-pass filter (116) in order to achieve reduced recovery time in response to intensity modulated binary-coded data packets. By increasing $f_{L2}$ of the second baseband bandpass filter (126) from 500 kHz to 5 MHz, the recovery time constant for an Ethernet signal having a packet envelope peak amplitude 60 dB above the squelch threshold is reduced by a factor of 10 to 220 ns, or 2.2 bits. Squelch sensitivity is maintained, since little signal energy is lost when $f_{L2}$ is increased because Manchester-encoded Ethernet signals have a broad spectral peak near 5 MHz.

In the packet squelch unit (134), the RSSI output (132) is operably coupled to the input (148) of the comparator (146) through the tandem combination of the second transimpedance amplifier (136) and the R-C (i.e., resistor-capacitor) high-pass coupling network (138). When RSSI output (132) is generated by a current source, the second transimpedance amplifier (136) may be advantageously employed as a low-impedance current sink which minimizes the RSSI response time associated with source parasitic capacitance. The R-C high-pass coupling network (138), referenced to voltage reference (144), blocks the slowly-varying changes in RSSI output (132) which may be associated with variations in the level of background electromagnetic radiation (106). The time constant of R-C high-pass network (138) is selected to be significantly greater than the longest data packet duration present in electromagnetic signal (104). A clamping diode (140), and a forward-biased compensating diode (141) maintain the base line of data packet signals at input (148) at a level determined by voltage reference (144). When the amplitude of a data packet signal at input (148) exceeds the predetermined squelch threshold voltage $\Delta V$ (142), then the comparator (146) provides a control signal (150) to the squelch switch (122) so that the binary signal (120) is present at the data output (152). The selection of the predetermined squelch threshold voltage $\Delta V$ (142) is a compromise between the threshold sensitivity and the falsing rate.

Thus, the device for indicating received signal strength and presence for intensity modulated binary-coded data packets with reduced recovery time in a packet data receiving system, includes: a receiver (101) for binary coded wireless data packets having a first band-pass processing unit (114), for receiving modulated electromagnetic signals and converting the modulated electromagnetic signals to binary data signals; and a second band-pass processing unit (124) for providing a logarithmic received signal strength indicator signal, RSSI, using a low-frequency cutoff $f_{L2}$ greater than a low-frequency cutoff $f_{L1}$ of the first first second band-pass processing unit. The device may further include a packet squelch unit (134), coupled to the second band-pass processing unit (124), for using the RSSI signal to provide a data squelch signal. In one embodiment, the device may be included within a modem.

The receiver (101) includes a detector of electromagnetic energy that is typically a photodiode or a Gunn diode.

The receiver (101), the second band-pass processing unit (124), and the packet squelch unit (134) may be implemented in an application specific integrated circuit or a digital signal processor or a combination of both.

Figure 2:
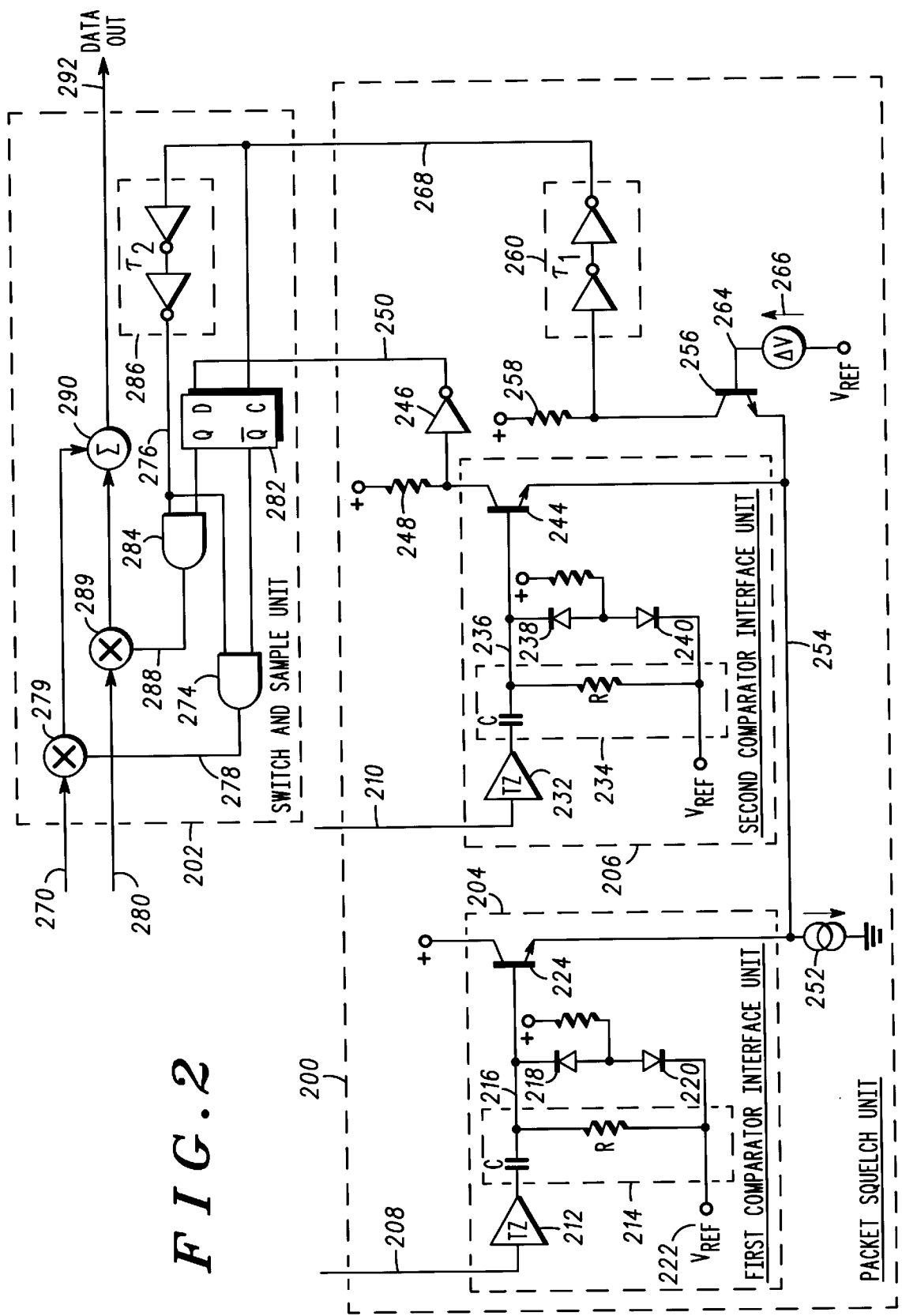
FIG. 2 shows a block diagram of a packet squelch unit and a squelch switch unit for use with a receiving system for binary-coded wireless data packets comprising a plurality of receiver branches in accordance with the present invention.

FIG. 2 is a block diagram of a packet squelch unit (200) and switch and sample unit (202) for use with two receiving branches. An example of a receiving branch is receiving branch (103) of FIG. 1. in packet squelch unit (200) are a first comparator interface unit (204) and a second comparator interface unit (206). Input to the first comparator interface unit (204) at (208) is a first RSSI output from a first receiving branch, and the input to the second comparator interface unit (206) at (210) is a second RSSI output from a second receiving branch.

In the first comparator interface unit (204), first RSSI output (208) is operably coupled to base (216) of transistor (224) through the tandem combination of the transimpedance amplifier (212) and the R-C high-pass coupling network (214). The function of the transimpedance amplifier (212) and the R-C high-pass coupling network (214) corresponds, respectively, to the transimpedance amplifier (136) and the R-C high-pass coupling network (138) of FIG. 1. The clamping diode (218) and the forward-biased compensating diode (220) maintain the base line of data packet signals present at the base (216) at a level determined by voltage reference $V_{ref}$ (222).

In the second comparator interface unit (206), the second RSSI output (210) is operably coupled to the base (236) of the transistor (244) through the tandem combination of the transimpedance amplifier (232) and the R-C high-pass coupling network (234). The function of the transimpedance amplifier (232) and the R-C high-pass coupling network (234) corresponds, respectively, to the transimpedance amplifier (136) and the R-C high-pass coupling network (138) of FIG. 1. The clamping diode (238) and the forward-biased compensating diode (240) maintain the base line of data packet signals present at the base (236) at a level determined by voltage reference $V_{ref}$ (222).

Transistor (224), transistor (244), and transistor (256) form a multiple-input voltage comparator having a common emitter connection (254) and current source (252). Current from the current source (252) flows through the transistor associated with the highest voltage among base (216), base (236), and base (264). Transistor (224), transistor (244), and transistor (256) are preferably either located on the same substrate, or selected from discrete devices so as to have substantially equal base-to-emitter voltages and current gains.

When current flows in the transistor (244), a voltage drop is produced across the resistor (248) with sufficient magnitude so that a high logic state exists at output (250) of invertor (246). A high logic state at output (250) of the invertor (246) is associated with a data packet magnitude sensed by second RSSI output (210) which is greater than the data packet magnitude of the first RSSI output (208). A low logic state at output (250) of invertor (246) is associated with a data packet magnitude sensed by the first RSSI output (208) which is greater than the data packet magnitude of the second RSSI output (210).

When current flows in the transistor (256), a voltage drop is produced across the resistor (258) with a sufficient magnitude so that a low logic state exists at output (268) of delay (260). When the delay (260) is in the low logic state, then the data packet magnitude sensed by both the first RSSI output (208) and the second RSSI output (210) is less than the magnitude of the predetermined squelch threshold voltage ΔV (266). When the delay (260) is in the high logic state, then the data packet magnitude sensed by either the first RSSI output (208) or the second RSSI output (210) or both is greater than the magnitude of the predetermined squelch threshold voltage ΔV (266). The selection of the predetermined squelch threshold voltage ΔV (266) is a compromise between the threshold sensitivity and the falsing rate. The predetermined time delay, $\tau_1$, associated with delay (260) is chosen to exceed the time required for the first RSSI output (208) and the second RSSI output (210) to achieve a steady-state value at the beginning of a data packet.

In the switch and sample unit (202), the state of the branch selection output (250) is sampled by the latch (282) when the squelch output (268) changes from a low logic state to a high logic state. Q and $\overline{Q}$ outputs from latch (282) are input, respectively, to AND gate (284), and AND gate (274). The squelch output (268), having being delayed in time by delay (286), is also operably coupled to AND gate (284) and to AND gate (274). The predetermined time delay, $\tau_2$, associated with delay (286) is chosen to exceed the propagation delay of latch (282). AND gate (274) produces control (278) for operating the first branch signal switch (279), and AND gate (284) produces control (288) for operating the second branch signal switch (289).

The first binary signal (270) is operably coupled to the summing junction (290) through the first branch signal switch (279). The second binary signal (280) is operably coupled to the summing junction (290) through the second branch signal switch (289). When the data packet magnitude at the first RSSI output (208) exceeds both the predetermined squelch threshold voltage ΔV (266) and the data packet magnitude at the second RSSI output (210), then the data output (292) is binary signal (270). When the data packet magnitude at the second RSSI output (210) exceeds both the predetermined squelch threshold voltage ΔV (266) and the data packet magnitude at the first RSSI output (208), then the data output (292) is binary signal (280).

Where the packet data receiving system includes a plurality of branches, each branch having a receiver, a second band-pass processing unit, the packet squelch unit typically: A) compares each RSSI signal from each second band-pass processing unit to a predetermined threshold; B) fails to provide a data squelch signal when the RSSI signals from all branches fail to exceed the predetermined threshold; C) selects the branch associated with the one RSSI signal to provide the data squelch signal when only one RSSI signal is greater than the predetermined threshold; and D) selects a branch associated with a largest RSSI; signal to provide the data squelch signal when more than one RSSI signal is greater than the predeterined threshold, where the selection process is unaffected by slowly varying changes in background electromagnetic signals.

Figure 3:
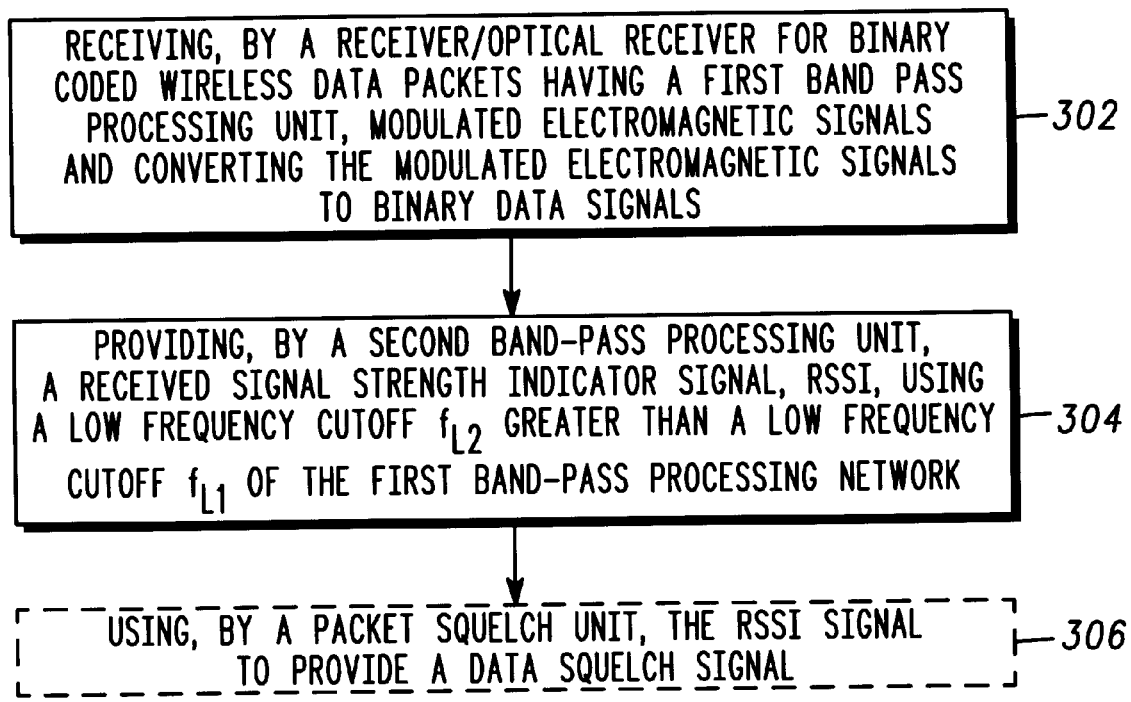
FIG. 3 is a flow chart of steps of one embodiment of a method for indicating received signal strength and presence for intensity modulated binary-coded data packets with reduced recovery time in a packet data receiving system in accordance with the present invention.

FIG. 3, numeral 300, is a flow chart of steps of one embodiment of a method for indicating received signal strength and presence for intensity modulated binary-coded data packets with reduced recovery time in a packet data receiving system in accordance with the present invention. The method includes the steps of: A) receiving (302), by a receiver/optical receiver for binary coded wireless data packets having a first band-pass processing unit, modulated electromagnetic signals and converting the modulated electromagnetic signals to binary data signals; and B) providing (304), by a second band-pass processing unit, a received signal strength indicator signal, RSSI, using a low-frequency cutoff $f_{L2}$ greater than a low-frequency cutoff $f_{L1}$ of the first first second band-pass processing unit.

The method may further include using (306), by a packet squelch unit, the RSSI signal to provide a data squelch signal. Where the packet data receiving system includes a plurality of branches, each branch having a receiver and a second band-pass processing unit, the steps implemented by the packet squelch unit typically include: A) comparing each RSSI signal from each second band-pass processing unit to a predeterined threshold; B) failing to provide a data squelch signal where the RSSI signals from all branches fail to exceed the predetermined threshold, by the packet squelch unit; C) selecting the branch associated with the one RSSI signal to provide the data squelch signal where only one RSSI signal is greater than the predetermined threshold; and D) selecting a branch associated with a largest RSSI signal to provide the data squelch signal where more than one RSSI signal is greater than the predetermined threshold. As in the device, the receiver typically includes a detector of electromagnetic energy that is a photodiode or a Gunn diode. Also, the receiver, the second band-pass processing unit, and the packet squelch unit are typically implemented in an application specific integrated circuit, a digital signal processor, or a combination of both.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A device for indicating received signal strength and presence for intensity modulated binary-coded data packets with reduced recovery time in a packet data receiving system, comprising:

A) a receiver for binary coded wireless data packets having a first band-pass processing unit, having a low-frequency cutoff $f_{L1}$ for receiving modulated electromagnetic signals and converting the modulated electromagnetic signals to binary data signals; and B) a second band-pass processing unit, having a low-frequency cutoff $f_{L2}$ and coupled to the receiver, for providing a logarithmic received signal strength indicator signal, RSSI, using the low-frequency cutoff $f_{L2}$ greater than the low-frequency cutoff $f_{L1}$ of the first band-pass processing unit.

2. The device of claim 1 further including a packet squelch unit, coupled to the receiver and the second band-pass processing unit, for using the RSSI signal to provide a data squelch signal.

3. The device of claim 2 wherein the packet data receiving system comprises a plurality of branches, each branch having a receiver, a second band-pass processing unit, wherein the packet squelch unit:

A) compares each RSSI signal from each second band-pass processing unit to a predeterined threshold;

B) fails to provide a data squelch signal when the RSSI signals from all branches fail to exceed the predetermined threshold;

C) selects the branch associated with the one RSSI signal to provide the data squelch signal when only one RSSI signal is greater than the predetermined threshold; and D) selects a branch associated with a largest RSSI signal to provide the data squelch signal when more than one RSSI signal is greater than the predetermined threshold, where the selection process is unaffected by slowly varying changes in background electromagnetic signals.

4. The device of claim 1 wherein the receiver includes a detector of electromagnetic energy that is one of:

A) a photodiode; and

B) a Gunn diode.

5. The device of claim 2 wherein the receiver, the second band-pass processing unit, and the packet squelch unit are implemented in at least one of:

A) an application specific integrated circuit; and

B) a digital signal processor.

6. A device for indicating received signal strength and presence for intensity modulated binary-coded data packets with reduced recovery time in a packet data receiving system, comprising:

A) an optical receiver for binary coded wireless data packets having a first band-pass processing unit, having a low-frequency cutoff $f_{L1}$ for receiving modulated electromagnetic signals and converting the modulated electromagnetic signals to binary data signals; and B) a second band-pass processing unit, having a low-frequency cutoff $f_{L2}$ and coupled to the receiver, for providing a received signal strength indicator signal, RSSI, using the low-frequency cutoff $f_{L2}$ greater than the low-frequency cutoff $f_{L1}$ of the first band-pass processing unit.

7. The device of claim 6 further including a packet squelch unit, coupled to the receiver and the second band-pass processing unit, for using the RSSI signal to provide a data squelch signal.

8. The device of claim 6 wherein the optical receiver includes a photodiode detector.

9. The device of claim 6 wherein the optical receiver includes:

A) a photodiode detector, coupled to receive optical data packets, for converting the optical data packets to current;

B) a high-pass coupling network, coupled to the photodiode detector, for providing a current signal substantially free of background response;

C) a first transimpedance amplifier, coupled to the high-pass coupling network, for converting the current signal to a voltage signal;

D) the first band-pass processing unit, coupled to the first transimpedance amplifier, for providing a substantially noise-free data signal.

10. The device of claim 9 wherein the first band-pass processing unit includes:

A) a first baseband band-pass filter, coupled to the first transimpedance amplifier, for converting the modulated electromagnetic signals to binary data signals; and B) a limiter, coupled to the first baseband band-pass filter, for providing binary data signals.

11. The device of claim 6 wherein the second band-pass processing unit includes:

A) a second baseband band-pass filter, coupled to the first transimpedance amplifier, for filtering the voltage signal using a low-frequency cutoff $f_{L2}$ greater than a low-frequency cutoff $f_{L1}$ of the first band-pass processing unit; and B) a received signal strength indicator, coupled to the second baseband band-pass filter, for providing a received signal strength indication.

12. A method for indicating received signal strength and presence for intensity modulated binary-coded data packets with reduced recovery time in a packet data receiving system, comprising the steps of:

A) receiving, by a receiver for binary coded wireless data packets having a first band-pass processing unit having a low-frequency cutoff $f_{L1}$, modulated electromagnetic signals and converting the modulated electromagnetic signals to binary data signals; and B) providing, by a second band-pass processing unit having a low-frequency cutoff $f_{L2}$, a received signal strength indicator signal, RSSI, using the low-frequency cutoff $f_{L2}$ greater than the low-frequency cutoff $f_{L1}$ of the first band-pass processing unit.

13. The method of claim 12 further including using, by a packet squelch unit, the RSSI signal to provide a data squelch signal.

14. The method of claim 13 wherein the packet data receiving system comprises a plurality of branches, each branch having a receiver, a second band-pass processing unit, wherein steps implemented by the packet squelch unit include:

A) comparing each RSSI signal from each second band-pass processing unit to a predeterined threshold;

B) failing to provide a data squelch signal where the RSSI signals from all branches fail to exceed the predetermined threshold, by the packet squelch unit;

C) selecting the branch associated with the one RSSI signal to provide the data squelch signal where only one RSSI signal is greater than the predetermined threshold; and D) selecting a branch associated with a largest RSSI signal to provide the data squelch signal where more than one RSSI signal is greater than the predetermined threshold.

15. The method of claim 12 wherein the receiver includes a detector of electromagnetic energy that is one of:

A) a photodiode; and

B) a Gunn diode.

16. The method of claim 13 wherein the receiver, second band-pass processing unit, and packet squelch unit are implemented in at least one of:

A) an application specific integrated circuit; and

B) a digital signal processor.

17. A method for indicating received signal strength and presence for intensity modulated binary-coded data packets with reduced recovery time in a packet data receiving system, comprising:

A) receiving, by an optical receiver for binary coded wireless data packets having a first band-pass processing unit having a low-frequency cutoff $f_{L1}$, modulated electromagnetic signals and converting the modulated electromagnetic signals to binary data signals; and B) providing, by a second band-pass processing unit having a low-frequency cutoff $f_{L2}$, a received signal strength indicator signal, RSSI, using the low-frequency cutoff $f_{L2}$ greater than the low-frequency cutoff $f_1$ of the first band-pass processing unit.

18. The method of claim 17 further including using, by packet squelch unit, the RSSI signal to provide a data squelch signal.

19. The method of claim 17 wherein the steps implemented by the optical receiver include:

A) converting, using a photodiode detector, the optical data packets to current;

B) providing, by a high-pass coupling network, a current signal substantially free of background response;

C) converting, by a first transimpedance amplifier, the current signal to a voltage signal; and D) providing, by the first band-pass processing unit, a substantially noise-free data signal.

20. The method of claim 17 wherein the first band-pass processing unit implements the steps of:

A) converting the modulated electromagnetic signals to binary data signals; and

B) providing limited binary data signals.

21. The method of claim 17 wherein the second band-pass processing unit implements the steps of:

A) filtering the voltage signal using a low-frequency cutoff $f_{L2}$ greater than a low-frequency cutoff $f_{L1}$ of the first band-pass processing unit; and B) providing a received signal strength indication.

22. A modem having a device for indicating received signal strength and presence for intensity modulated binary-coded data packets with reduced recovery time in a packet data receiving system, the device comprising:

A) a receiver for binary coded wireless data packets having a first band-pass processing unit, having a low-frequency cutoff $f_{L1}$ for receiving modulated electromagnetic signals and converting the modulated electromagnetic signals to binary data signals; and B) a second band-pass processing unit, having a low-frequency cutoff $f_{L2}$ and coupled to the receiver, for providing a received signal strength indicator signal, RSSI, using the low-frequency cutoff $f_{L2}$ greater than the low-frequency cutoff $f_{L1}$ of the first band-pass processing unit.

23. The modem of claim 22 further including a packet squelch unit, coupled to the receiver and the second band-pass processing unit, for using the RSSI signal to provide a data squelch signal.

24. The modem of claim 23 wherein the packet data receiving system comprises a plurality of branches, each branch having a receiver, a second band-pass processing unit, wherein the packet squelch unit:

A) compares each RSSI signal from each second band-pass processing unit to a predeterined threshold;

B) fails to provide a data squelch signal when the RSSI signals from all branches fail to exceed the predetermined threshold, the packet squelch unit;

C) selects the branch associated with the one RSSI signal to provide the data squelch signal when only one RSSI signal is greater than the predetermined threshold; and D) selects a branch associated with a largest RSSI signal to provide the data squelch signal when more than one RSSI signal is greater than the predetermined threshold.

25. The modem of claim 22 wherein the receiver includes a detector of electromagnetic energy that is one of:

A) a photodiode; and

B) a Gunn diode.

26. The modem of claim 23 wherein the receiver, second band-pass processing unit, and packet squelch unit are implemented in at least one of:

A) an application specific integrated circuit; and

B) a digital signal processor.

* * * * *